United States Patent Office 3,186,272
Patented June 1, 1965

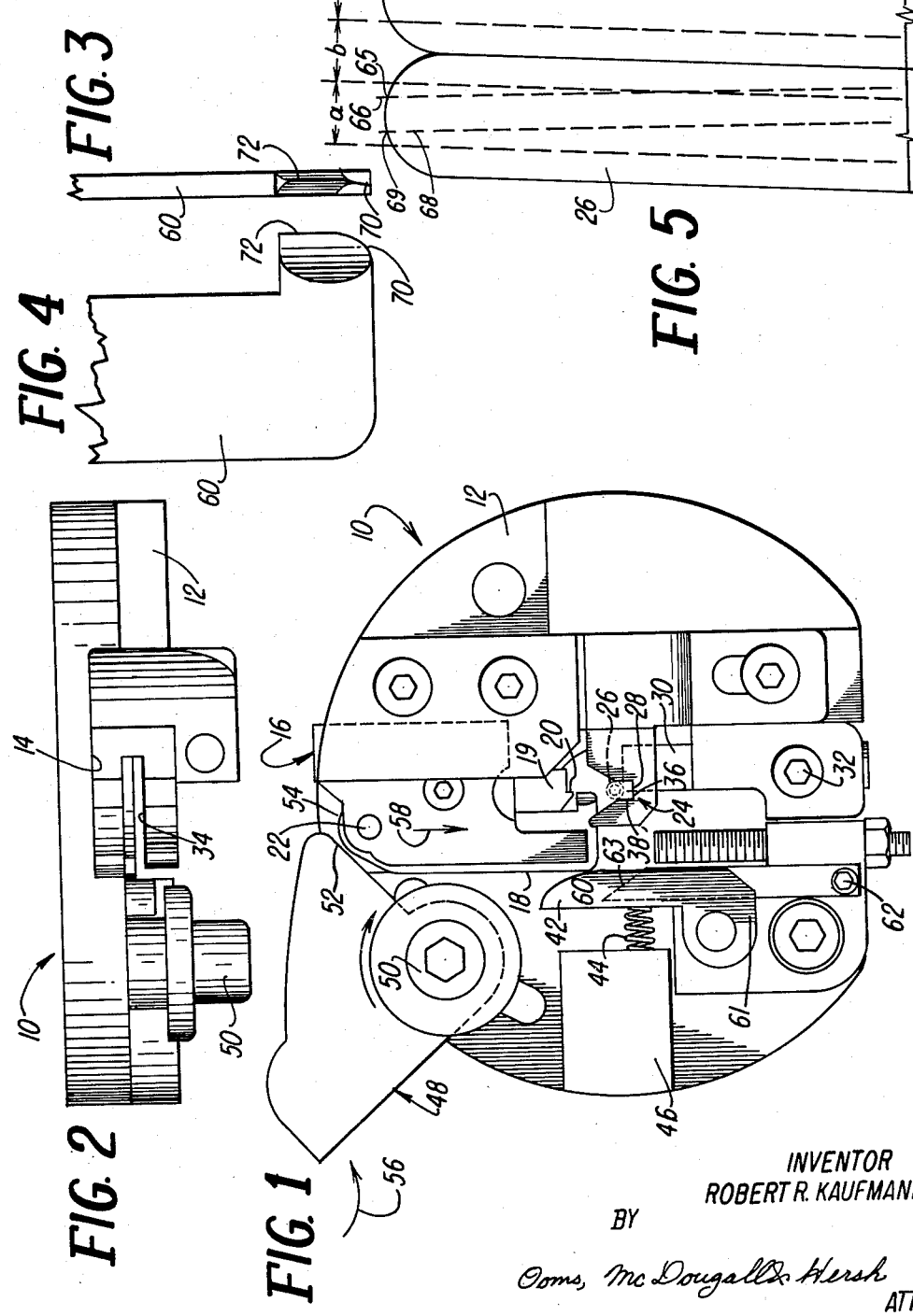
June 1, 1965     R. R. KAUFMANN     3,186,272
COIL SPRING CUTTER HAVING RESILIENTLY MOUNTED MEANS
TO SEPARATE THE COIL PRIOR TO CUTTING
Filed Oct. 29, 1962     2 Sheets-Sheet 1
INVENTOR
ROBERT R. KAUFMANN
BY
Ooms, McDougall & Hersh
ATTYS.

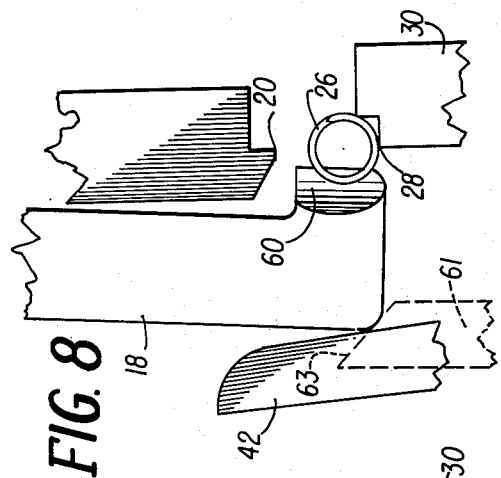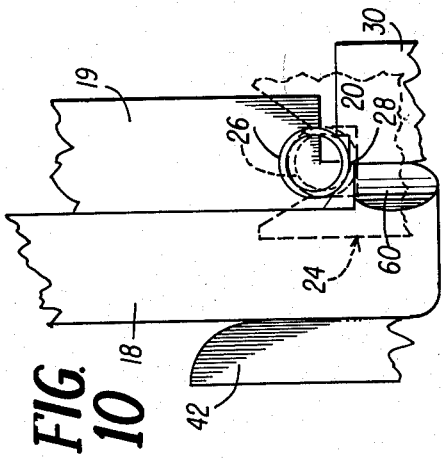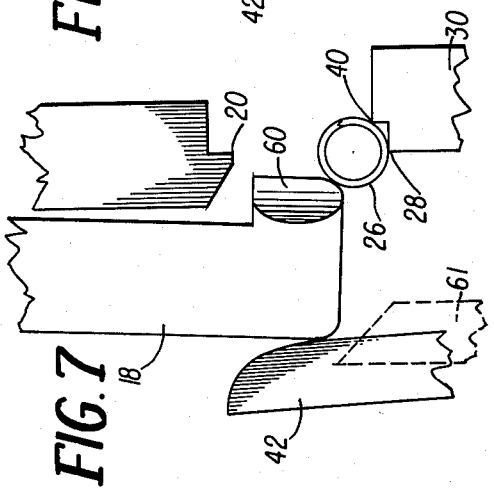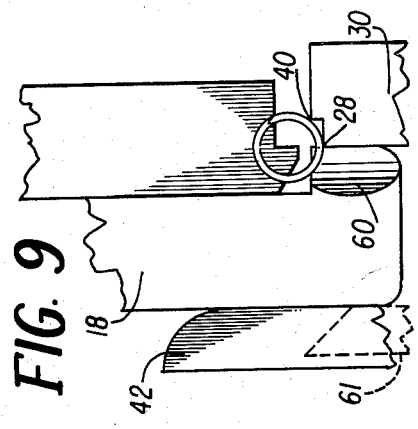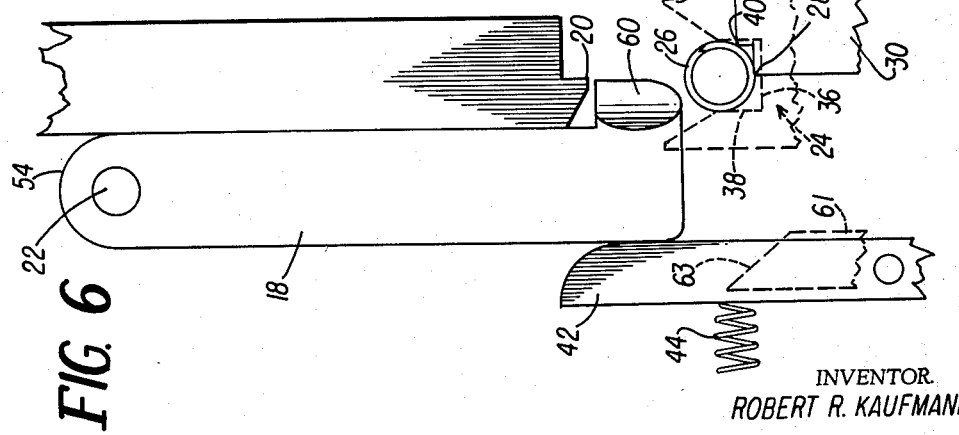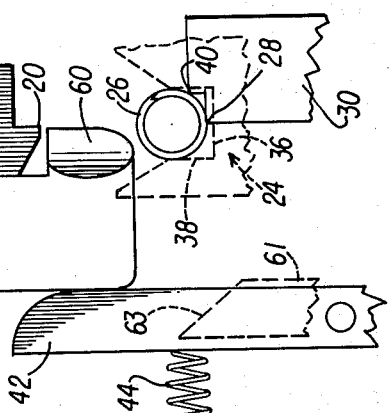

3,186,272
COIL SPRING CUTTER HAVING RESILIENTLY MOUNTED MEANS TO SEPARATE THE COIL PRIOR TO CUTTING
Robert R. Kaufmann, 2717 W. 83rd St., Chicago 52, Ill.
Filed Oct. 29, 1962, Ser. No. 233,595
14 Claims. (Cl. 83—18)

This invention relates to an apparatus for cutting coils and its is particularly directed to means for cutting coil springs or the like which are characterized by closely spaced helices. The apparatus of this invention includes in combination with cutting means a separating means for parting helices of a coil whereby the coil can be cut without disruption of uniformity.

In the manufacture of coil springs and similar constructions, a continuous length of wire is formed into continuous lengths of helical coiled wire. This wire, which may be steel or its alloys, provides springs which are commonly used in many mechanical and electrical systems. In one particular application, helical coiled springs of small diameter are provided with formed ends and utilized in office machines. such as typewriters and adding machines, where precision operation is of great importance. Accordingly, damage to the springs which would destroy uniformity in operation must be avoided during the manufacturing processes.

Since a great number of springs of the type described are produced, it is desirable to provide means for manufacturing these springs at a high rate of speed. There are available coilers and speed lathes which are suitable for manufacturing continuous lengths of the helical coiled wire at high speeds, however, the means for cutting the wire into desired lengths after coiling have not been entirely satisfactory. Thus, where attempts have been made to sever the coils at a high rate, the cutting instruments have exhibited a tendency toward distorting the severed ends of the coil. A large number of rejects results from such an operation, however, where more care is taken to avoid distortion in the cutting operation, a material reduction in the production rate results.

It is one object of this invention to provide an apparatus and method for the cutting of continuous lengths of coil whereby a highly efficient operation can be accomplished.

It is an additional object of this invention to provide a means for cutting continuous lengths of helical coiled wire which is capable of operating at a high rate of speed without any significant occurrence of distortion in the severed ends of lengths cut from a continuous coil.

It is a more particular object of this invention to provide a coil cutting apparatus which is characterized by a unique separator means which is adapted to spread closely spaced helices in a coil without distortion of the coil and to thereby permit introduction of cutting means for severing into coil lengths without the danger of distortion of the severed ends.

These and other objects of this invention will appear hereinafter, and for purposes of illustration but not of limitation, specific embodiments of this invention are shown in the accompanying drawings in which:

FIGURE 1 is an elevational view of the separating and cutting mechanism of this invention;

FIGURE 2 is a top plan view of the mounting plate which characterizes the separating and cutting mechanism;

FIGURE 3 is an end view of the separator of this invention illustrating the novel blade configuration thereof;

FIGURE 4 is a side elevation of the separator shown in FIGURE 3;

FIGURE 5 is a schematic elevational view of a coil fragment illustrating the area of entry for a separator blade; and FIGURES 6 through 10 comprise schematic elevational views illustrating the sequence of operation which characterizes the instant invention.

As indicated, the instant invention comprises a system which includes a separating and cutting apparatus which are adapted to cooperate in the severing of continuous helical coiled wire into desired lengths. The apparatus of the invention is characterized by a nest which is adapted to receive and support the continuous coil for a cutting operation. First and second cutting edges are provided adjacent this nest whereby a single helix of the coil can be severed.

The separator means of this invention includes a blade member which is adapted to move into contact with the coil to separate closely spaced helices thereof to permit positioning of the cutting edges whereby they can engage the single helix and provide for cutting of the coil. The separator means is provided with a mounting which permits it to yield when resisted by a helix of a coil. The separator means is then adapted to ride on this helix until it finds a point of entry between this helix and an adjoining helix whereby the separator means will never cause distortion in a coil which it engages.

In accordance with the preferred form of this invention, a stationary cutting edge is located within the nest which supports the coil. A movable cutting edge is adapted to move into this nest and the separator blade is operatively associated with this movable cutting edge in a manner such that it will precede the movable cutting edge during each movement of the movable cutting edge toward the stationary cutting edge.

It has been discovered that the separator blade will be resisted by a coil helix within a relatively wide area across the diameter of the coil. Accordingly, the instant invention provides means for assuring entry of the separator blade during its passage in engagement with a helix of a coil. Specifically, the instant invention provides for an offset configuration in the trailing edge of the separator blade with respect to the leading edge thereof whereby one portion or the other of the blade will find an entry point during traverse of the blade in engagement with a coil helix.

The accompanying drawings illustrate one form which can be assumed by an apparatus characterized by the features of this invention. In FIGURES 1 and 2, there is illustrated a separating and cutting mechanism 10 which includes a mounting plate 12. This mounting plate defines a channel 14 which is adapted to receive separating and cutting element 16 for reciprocal movement therein.

FIGURE 1 illustrates the element 16 in its vertically raised position within the channel 14. This element includes a separator member 18 and member 19 which defines a movable cutting edge 20. The separator 18 is pivotally connected to the element 16 and 22 and is adapted to pivot away from the normal position shown for reasons to be explained.

Situated beneath the element 16, there is provided a nest 24 which is adapted to receive the coil 26. A stationary cutting edge 28 defined by the element 30 protrudes into the nest 24. The element 30 is mounted on the plate 12 by means of the bolt 32 and extends through slot 34 to thereby permit location of the cutting edge 28 within the nest 24.

As best shown in FIGURE 6, the nest 24 comprises a base portion 36 and vertically disposed side walls 38. The coil 26 is normally maintained in spaced-apart relation with respect to the base 36 by means of the cutting edge 28. A shoulder 40 also defined in the element 30 prevents displacement of a coil helix laterally into the slot 34 during the separating and cutting operation.

The separator means 18 is engaged by a pressure member 42. A light compression spring 44 is mounted between the pressure member and the block 46 formed in the mounting plate 12. Through the action of the spring 44, the pressure member urges the separator means 18 into engagement with the coil 26 upon vertical descent of the element 16.

In order to effect vertical displacement of the element 16, there is provided a cam member 48 which is adapted to oscillate about the shaft 50 formed in the plate 12. The cam edge 52 is adapted to engage the top end 54 of the separator 18 when force is applied to the cam 48 as suggested by the arrow 56. The application of this force to the separator means 18 urges this separator means, the element 16, and the associated cutting edge 20 downwardly as suggested by the arrow 58. After a cutting operation has been performed, the element 16 is preferably returned by a spring mounting (not shown) which normally biases this element 16 upwardly. It will be appreciated, however, that the element 16 can be mechanically driven upwardly in the normal cycle of operation.

FIGURES 6 through 10 illustrate the sequence of operations which take place when the element 16 and associated separating and cutting means move downwardly. As shown in FIGURE 6, the blade 60 of the separator means 18 will move into engagement with a helix of the coil 26 during its downward stroke. The pressure member 42 normally maintains the separator means in a path whereby the blade 60 contacts a helix of the coil at approximately its uppermost point. As shown in FIGURE 7, if the blade 60 is resisted by the helix which it engages, the blade will begin to ride along the periphery of the helix and will, therefore, pivot outwardly in opposition to the action of the pressure member 42.

Due to the pitch of the helix engaged by the blade 60, the blade will eventually find a point of entry between the engaged helix and an adjacent helix as shown in FIGURE 8. This point of entry will be reached before the blade completes a quarter turn on the engaged helix and it will be reached before the movable cutting edge 28 can move into the path of the coil 26. Accordingly, adjacent helices of a coil will be spread apart before the cutting edge has been moved downwardly a sufficient amount to distort a coil, and, therefore, the cutting edge will move freely into engagement with the helix to be severed.

It will be noted that element 61 is mounted on the mounting plate 12 by means of bolt 62. This element includes cam surface 63 which is adapted to engage the separator means 18 to urge this separator means between coil helices at approximately the time that the separator means has completed its traverse over one quarter turn of a helix. This cam member serves as further assurance of proper operation since, with this arrangement, the separator means 18 must move between helices prior to entry of the cutting edge 20.

It will be noted that the coil 26 is spaced from the base 36 of the nest 24 by means of the cutting edge 28. With this arrangement, it has been found that bending of a severed end of a coil can be avoided since the severed end is permitted to "give" as the movable cutting edge cuts through a helix. Thus, as illustrated in FIGURE 10, the portion of the coil 26 behind the cutting element 19 is moved downwardly when the cutting edge 20 has passed through the helix. By permitting this freedom of movement of the severed coil, the coil will be completely restored to its proper configuration upon raising of the cutting edge 20.

It will be appreciated that if the blade 60 does not encounter a point of entry upon its travel in engagement with a helix, then separation of the coils could not be accomplished and there would be a clear danger of distortion during the severing operation. The coil fragment illustrated in FIGURE 5 and having an axis 64 will be utilized to illustrate the problems which are encountered when it is desired to separate and cut closely wound helical coils. It has been observed that the distance $a$ across the surface of a helix represents an area of non-entry. In other words, if the edge of a separator blade engages a helix within this portion of the surface, which portion is approximately ½ the diameter of the helix, the blade will be resisted by the helix. On the other hand, the distance $b$ represents the area of entry whereby a blade contacting a helix at this point will operate to separate adjoining helices without significant resistance from the helix engaged.

It will be appreciated that if a blade contacts a helix at the upper extremity, the blade will travel a path perpendicular to the axis of the coil. For example, if the blade contacts the point 65 on the surface of the helix, then it will travel along the periphery of the helix in the path designated by the dotted line 66. It will also be appreciated that in the course of this travel due to the pitch of the coil, the blade edge will pass from the non-entry area $a$ to the entry area $b$ whereby separation of the helices can be effected.

The dotted line 68 illustrates a second possible path which can be taken by a blade which originally contacts a helix at the point 69. It will be noted that in this instance, the blade edge will fail to pass out of non-entry area $a$ during a quarter turn of traverse over the periphery of the helix. The instant invention, however, provides for this contingency by designing the blade 60 in the manner shown in FIGURES 3 and 4. It will be noted therein that the blade 60 comprises a leading edge 70 and a trailing edge 72 which is offset with respect to the leading edge. Again, referring to FIGURE 5, it will be noted that even if the leading edge 70 of a blade contacts the coil at the point 69 and travels along the path 68, the trailing edge 72 will still provide for separation since it will be following a path offset from the path 68, for example the path 66. With an arrangement of this nature, a blade can be designed for any coil configuration whereby separation can be insured during a quarter turn of travel by the separator blade over a coil helix.

It will be understood that the amount of offset between leading and trailing edges of a separator blade will be dependent upon the diameter of a coil and the pitch of the coil. The offset to be provided should insure entry of the offset edge into an entry area $b$ even when the leading edge of the blade contacts the most extreme point in the non-entry area $a$. To provide an example of the concepts of this invention, reference may be made to an operation involving the cutting of a .20 inch O.D. coil spring made of .020 inch diameter wire and having .020 inch natural pitch. With a coil configuration of this type, .005 inch of pitch is encountered in a quarter turn of the coil, and since the non-entry area is about .010 inch, this pitch will accommodate approximately ½ of the non-entry area. By providing an offset in the blade edge of about .006 inch, the remainder of the non-entry area can be accommodated, and, therefore, even if the leading edge of the blade contacts an extreme end of the non-entry area, the pitch of the coil combined with the offset will provide for entry of the trailing edge.

As a further example, reference is made to the cutting into lengths of a continuous helical coiled wire having a .08 inch O.D. and made up of .008 inch wire with a natural pitch of .008 inch. With a pitch of .002 inch being encountered in a quarter turn, and with a .0025 inch offset in the separator blade, the approximately .004 inch non-entry area will be accommodated, and separation can be achieved under normal operating conditions.

It will be apparent that the system of this invention can be advantageously integrated into a continuous coil forming operation. The separating and cutting means described is adapted to be automatically operated as the coil forming mechanism is periodically stopped whereby the desired lengths of springs can be provided. It will be obvious that the mechanisms of this invention are highly efficient and will provide for relatively simple operation. Furthermore, the mechanisms can be employed in a rapidly operating production line with virtual elimination of reject springs having distorted ends. Although the mechanism of this invention is particularly suitable for use in combination with coiled wire having a small O.D., since these wires are more susceptible to distortion, the separating principles described can obviously be applied to other coils.

It will be understood that various modifications can be made in the above described separating and cutting system which provide the characteristics of this invention without departing from the spirit thereof particularly as defined in the following claims.

That which is claimed is:

1. A coil separating and cutting apparatus comprising a nest for supporting a coil to be cut, first and second cutting edges adapted to engage a single helix of said coil for cutting said helix, means for moving said cutting edges relative to each other whereby said cutting edges are adapted to penetrate through the periphery of said coil for cutting said helix, and a separator means, independent of said cutting edges, adapted to move into contact with said coil to separate helices thereof when a point of entry between said helices is encountered to thereby permit said engagement by said cutting edges, said separator means being mounted whereby it will yield when resisted by a helix of said coil, means causing said separator means to ride on the periphery of the resisting helix until said point of entry is encountered, said separator means being mounted whereby it will move into contact with said coil prior to entry of said cutting edges through the periphery of said coil.

2. An apparatus in accordance with claim 1 wherein said cutting edges comprise a stationary edge located in said nest, and a movable edge reciprocally mounted with respect to said stationary edge.

3. A coil separating and cutting apparatus comprising a nest for supporting a coil to be cut, first and second cutting edges adapted to engage a single helix of said coil for cutting said helix, and a separator means adapted to move into contact with said coil to separate helices thereof when a point of entry between said helices is encountered to thereby permit said engagement by said cutting edges, said separator means being mounted whereby it will yield when resisted by a helix of said coil, and means causing said separator means to ride on the periphery of the resisting helix until said point of entry is encountered, said cutting edges comprising a stationary edge located in said nest, and a movable edge reciprocally mounted with respect to said stationary edge, said separator means being reciprocally movable in the same direction as said movable edge and being adapted to pivot away from said movable edge when riding on said periphery, and including cam means positioned adjacent said nest for forcing said separator means between said helices when said movable edge is in position to enter between said helices.

4. A separating and cutting apparatus for use in combination with a continuous length of coil having closely spaced helices, comprising a nest for supporting the coil, first and second cutting edges adapted to engage a single helix of said coil for cutting said helix, and a separator means adapted to move into contact with said coil to separate helices thereof when a point of entry between said helices is encountered to thereby permit said engagement by said cutting edges, said separator means being mounted whereby it will yield when resisted by a helix of said coil, and means causing said separator means to ride on the periphery of the resisting helix until said point of entry is encountered, said cutting edges comprising a stationary edge located in said nest and a movable edge reciprocally mounted with respect to said stationary edge, said separator means being reciprocally movable in the same direction as said movable edge and being adapted to pivot away from said edge when riding on said periphery, and including cam means positioned adjacent said nest for forcing said separator means between said helices when said movable edge is in position to enter between said helices.

5. An apparatus in accordance with claim 4 wherein said separator includes a blade and means normally biasing said blade into the path of movement of said movable edge, and wherein the reciprocal movement of said movable edge and said separator are controlled by the same mechanism whereby said blade precedes said movable edge when moving toward said coil.

6. An apparatus in accordance with claim 5 wherein said blade includes a leading edge portion adapted to initially contact said coil, and a trailing edge portion, said trailing edge portion being laterally offset with respect to said leading edge portion.

7. A separating and cutting apparatus for use in combination with a continuous length of coil having closely spaced helices, comprising a nest for supporting the coil, said nest comprising a base and a pair of vertical walls extending from said base, said wall being spaced-apart a distance sufficient to receive said coil, a stationary cutting edge positioned within said nest and extending above said base, said stationary edge contacting said coil and supporting said coil in spaced relation with respect to said base, a movable cutting edge reciprocally mounted for vertical movement relative to said stationary edge, and a separator blade normally positioned between said cutting edges and reciprocally movable with said movable edge whereby said blade precedes said movable edge during vertical movement toward said stationary edge, said blade being adapted to move into contact with said coil to spread helices thereof when the blade encounters a point of entry between said helices, said blade being mounted whereby it will yield when resisted by a helix of said coil and said blade being adapted to ride on the periphery of the resisting helix, and means for urging said blade between said helices when it encounters a point of entry while riding on said resisting helix.

8. An apparatus in accordance with claim 7 wherein said blade includes a leading edge portion adapted to initially contact said coil, and a trailing edge portion, said trailing edge portion being laterally offset with respect to said leading edge portion.

9. A separating and cutting apparatus for use in combination with a continuous length of coil having closely spaced helices, comprising a nest for supporting the coil, said nest comprising a base and a pair of vertical walls extending from said base, said wall being spaced-apart a distance sufficient to receive said coil, a stationary cutting edge positioned within said nest and extending above said base, said stationary edge contacting said coil and supporting said coil in spaced relation with respect to said base, a movable cutting edge reciprocally mounted for vertical movement relative to said stationary edge, and a separator blade, independent of said cutting edges, normally positioned between said cutting edges and reciprocally movable with said movable edge whereby said blade precedes said movable edge during vertical movement toward said stationary edge, said blade being adapted to move into contact with said coil to spread helices thereof when the blade encounters a point of entry between said helices, said blade being mounted whereby it will yield when resisted by a helix of said coil and said blade being adapted to ride on the periphery of the resisting helix for as much as a quarter turn, said separator means being mounted whereby it will move into contact with said coil prior to entry of said cutting edges through the periphery of said coil.

10. A method for the separating and cutting of continuous lengths of coil having closely spaced helices comprising the steps of locating said coil between cutting edges comprising a stationary cutting edge and a movable cutting edge, providing a separator means adapted to contact said coil, moving said separator means into engagement with said coil, causing said separator means to ride on the periphery of a resisting helix of said coil for as much as a quarter turn until said separator means enters between said helix and an adjacent helix to separate these helices, and thereafter bringing said movable cutting edge into the opening between said helices to sever the coil.

11. A method in accordance with claim 10 wherein said separator means comprises a blade including a leading edge portion adapted to initially contact said coil and a trailing edge portion laterally offset with respect to said leading edge portion.

12. A method in accordance with claim 11 including the step of providing for movement of said blade over said helix for as much as a quarter turn.

13. An apparatus in accordance with claim 1 wherein said separator means is reciprocally movable and wherein said cutting edges comprise a stationary edge and a movable edge adapted to reciprocate in the same direction as said separator means, and wherein said separator means is adapted to pivot away from said movable edge when the separator means is riding on the periphery of a resisting helix.

14. A coil separating and cutting apparatus comprising a nest for supporting a coil to be cut, first and second cutting edges adapted to engage a single helix of said coil for cutting said helix, means for moving said cutting edges relative to each other whereby said cutting edges are adapted to penetrate through the periphery of said coil for cutting said helix, and a separator means, independent of said cutting edges, adapted to move into contact with said coil to separate helices thereof when a point of entry between said helices is encountered to thereby permit said engagement by said cutting edges, said separator means being mounted whereby it will yield when resisted by a helix of said coil, means causing said separator means to ride on the periphery of the resisting helix until said point of entry is encountered, said separator means being mounted whereby it will move into contact with said coil prior to entry of said cutting edges through the periphery of said coil and wherein said separator means includes a first portion for initially contacting said coil and a second portion laterally offset with respect to said first portion, said second portion being positioned behind said first portion for penetration between helices if said first portion does not accomplish penetration.

References Cited by the Examiner

UNITED STATES PATENTS

| 505,071 | 9/93 | Sterling et al. | 83—907 X |
| 1,560,228 | 11/25 | Garret | 83—907 X |
| 1,975,155 | 10/34 | Keller | 83—907 X |
| 1,976,686 | 10/34 | Wunderlich | 83—907 X |
| 2,568,775 | 9/51 | Stull | 83—907 X |
| 2,869,640 | 1/59 | Platt | 83—907 X |

FOREIGN PATENTS

| 892,668 | 1/44 | France. |

ANDREW R. JUHASZ, *Primary Examiner.*